(12) United States Patent
Mo et al.

(10) Patent No.: US 8,498,286 B2
(45) Date of Patent: Jul. 30, 2013

(54) RADIUS GATEWAY ON POLICY CHARGING AND RULES FUNCTION (PCRF) FOR WIRELINE/WIRELESS CONVERGED SOLUTION

(75) Inventors: Fan Mo, Kanata (CA); Satvinder Bawa, Ottawa (CA); Lui Yeung, Kanata (CA); Justin Newcomb, Kanata (CA); Lay Been Tan, Kanata (CA); Felix Landry, Pontiac (CA); Ivaylo Tanouchev, Ottawa (CA)

(73) Assignee: Alcatel Lucent, Paris (FR)

( * ) Notice: Subject to any disclaimer, the term of this patent is extended or adjusted under 35 U.S.C. 154(b) by 206 days.

(21) Appl. No.: 12/987,383

(22) Filed: Jan. 10, 2011

(65) Prior Publication Data

US 2012/0177028 A1 Jul. 12, 2012

(51) Int. Cl.
*H04L 12/28* (2006.01)

(52) U.S. Cl.
USPC .......................................................... 370/351

(58) Field of Classification Search
None
See application file for complete search history.

(56) References Cited

U.S. PATENT DOCUMENTS

| 7,855,982 | B2* | 12/2010 | Ramankutty et al. | 370/259 |
|---|---|---|---|---|
| 2008/0285475 | A1* | 11/2008 | Menditto | 370/252 |
| 2010/0311392 | A1* | 12/2010 | Stenfelt et al. | 455/411 |
| 2011/0116378 | A1* | 5/2011 | Ramankutty et al. | 370/235 |
| 2012/0005356 | A1* | 1/2012 | Hellgren | 709/229 |

OTHER PUBLICATIONS

Calhoun, P. et al., "Diameter Base Protocol", RFC 3588, Sep. 2003.*
Calhoun, P. et al., "Diameter Network Access Server Application", RFC 4005, Aug. 2005.*

\* cited by examiner

*Primary Examiner* — Ayaz Sheikh
*Assistant Examiner* — Blanche Wong
(74) *Attorney, Agent, or Firm* — Marks + Clerk

(57) ABSTRACT

A method and apparatus are provided for allowing a single platform to recognize and process both Diameter messages and Radius messages. A gateway is provided for translating Radius messages received from a wireline device into NASReq messages. A Diameter Proxy Agent receives both Diameter messages from a wireless device and the NASReq messages from the gateway. The Diameter Proxy Agent selects a PCRF to which to pass a NASReq message, and upon receipt of a NASReq message the PCRF either creates or updates a NASReq session object. By recognizing and processing Radius messages, wireline services can be offered at the same time as wireless services without requiring the use of a second platform. In addition, use of the PCRF server to support wireline services offers much better scalability than that offered by traditional AAA servers.

9 Claims, 3 Drawing Sheets

RADIUS GATEWAY ON POLICY CHARGING AND RULES FUNCTION (PCRF) FOR WIRELINE/WIRELESS CONVERGED SOLUTION

FIELD OF THE INVENTION

This invention relates to a PCRF within an Evolved Packet Core network, and more particularly to a method of communicating with a PCRF.

BACKGROUND OF THE INVENTION

Long Term Evolution (LTE) is a framework for packet-based real-time and non-real-time services, and is proposed as the next framework used by the telecommunications industry. LTE provides many other advantages over the existing frameworks, such as more efficient use of radio spectrum. One aspect of the LTE framework is an Evolved Packet Core (EPC), an all-IP core, specified by the 3rd Generation Partnership Project (3GPP). The EPC provides mobile core functionality that, in previous mobile generations (2G, 3G), was realized through two separate sub-domains: circuit-switched for voice traffic and packet-switched for data. Using an EPC, a single all-IP domain is used.

The EPC has various components, including a Serving Gateway (SGW), a Packet Data Network Gateway (PGW), a Mobility Management Entity (MME), and a Policy and Charging Rules Function (PCRF). The PCRF is a concatenation of Policy Decision Functions and Charging Rules Functions. It supports service data flow detection, policy enforcement, and flow-based charging.

In at least one implementation there are actually several PCRFs, in the form of blades. A Diameter Proxy Agent on the same platform as the PCRFs receives Diameter messages from wireless devices that wish to establish a service through the EPC. The Diameter Proxy Agent selects the most suitable PCRF on the platform, and thereafter allows communication between the selected PCRF and the wireless device by passing Diameter messages back and forth. Such communication manages the IP address assigned to the wireless device, authorizes communication from the wireless device, manages policy associated with the wireless device, and provides accounting services (e.g. usage statistics) associated with the wireless device.

Wireline services, such as wireline telephone services but also including internet and television services, are typically implemented using a different type of server, referred to as an Authentication, Authorization and Accounting (AAA) server. An AAA server provides similar functionality as the server used in establishing wireless services. A wireline device communicates with a DSLAM or router, which then communicates with the AAA server to provide the same services as outlined above for a wireless connection. The DSLAM or router communicates with the AAA server using Radius messages.

Different divisions within a communication company frequently provide different services to its customers, some divisions providing wireless services, such as mobile communications, and some divisions providing wireline services such as landline communications, television services, and internet access. These different services may even be provided by different companies within the same family of companies. This complicates management of these services by a central authority within the main company, and requires a degree of repetition of hardware and personnel. A communications company wishing to provide its customers with a variety of services usually has to use two servers, a server compliant with the 3GPP specifications in order to receive Diameter messages and an AAA server capable of processing Radius messages, and these servers are often managed by different divisions or sub-companies. A communication company may even use more than one AAA server for a given area, as AAA servers are typically not very scalable.

A solution which allowed communication with a PCRF server using messages in the Radius format would allow a provider of both wireless and wireline services to use a single server. In addition, use by a service provider of a PCRF server rather than a dedicated wireline server allows the number of users to scale more easily, allowing simpler addition of a large number of customers.

SUMMARY OF THE INVENTION

According to one aspect, the invention provides a method of enabling a communication session for a wireline device in an Evolved Packet Core. At a Radius gateway within a PCRF server a Radius message is received from the wireline device. At the Radius gateway, the Radius message is translated into a NASReq message. A PCRF cluster is selected to handle a session identified by the NASReq message, the selected PCRF cluster being configured to handle communication sessions for wireless devices. The NASReq message is passed to the selected PCRF cluster. It is determined whether a NASReq session object related to the session identified by the NASReq message exists, and if not, then such a NASReq session object is created. If such a NASReq session object does exist, then the NASReq session object is updated to reflect information in the NASReq message.

According to another aspect, the invention provides a PCRF server which has a Radius gateway for translating a Radius message into a NASReq message and for transmitting the NASReq message. The PCRF server also has a Diameter Proxy Agent for receiving a NASReq message from the Radius gateway, for selecting one of at least one PCRF cluster, and for forwarding the NASReq message to the selected PCRF cluster. The PCRF server also has at least one PCRF blade, each PCRF blade belonging to one of the PCRF clusters and configured to manage wireless devices, each PCRF blade for receiving a NASReq message and creating or updating a NASReq session object in response thereto. The PCRF server may also have a mapping which maps at least one session to each of the at least one PCRF cluster, and the Diameter Proxy Agent being configured to select one of the PCRF clusters by selecting the PCRF cluster to which the fewest sessions are currently mapped.

The methods of the invention may be stored as processing instructions on computer-readable storage media, the instructions being executable by a computer processor.

The invention allows a single platform to recognize and process both Diameter messages and Radius messages. By recognizing and processing Radius messages, wireline services can be offered at the same time as wireless services without requiring the use of a second platform. In addition, use of the PCRF server to support wireline services offers much better scalability than that offered by traditional AAA servers.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
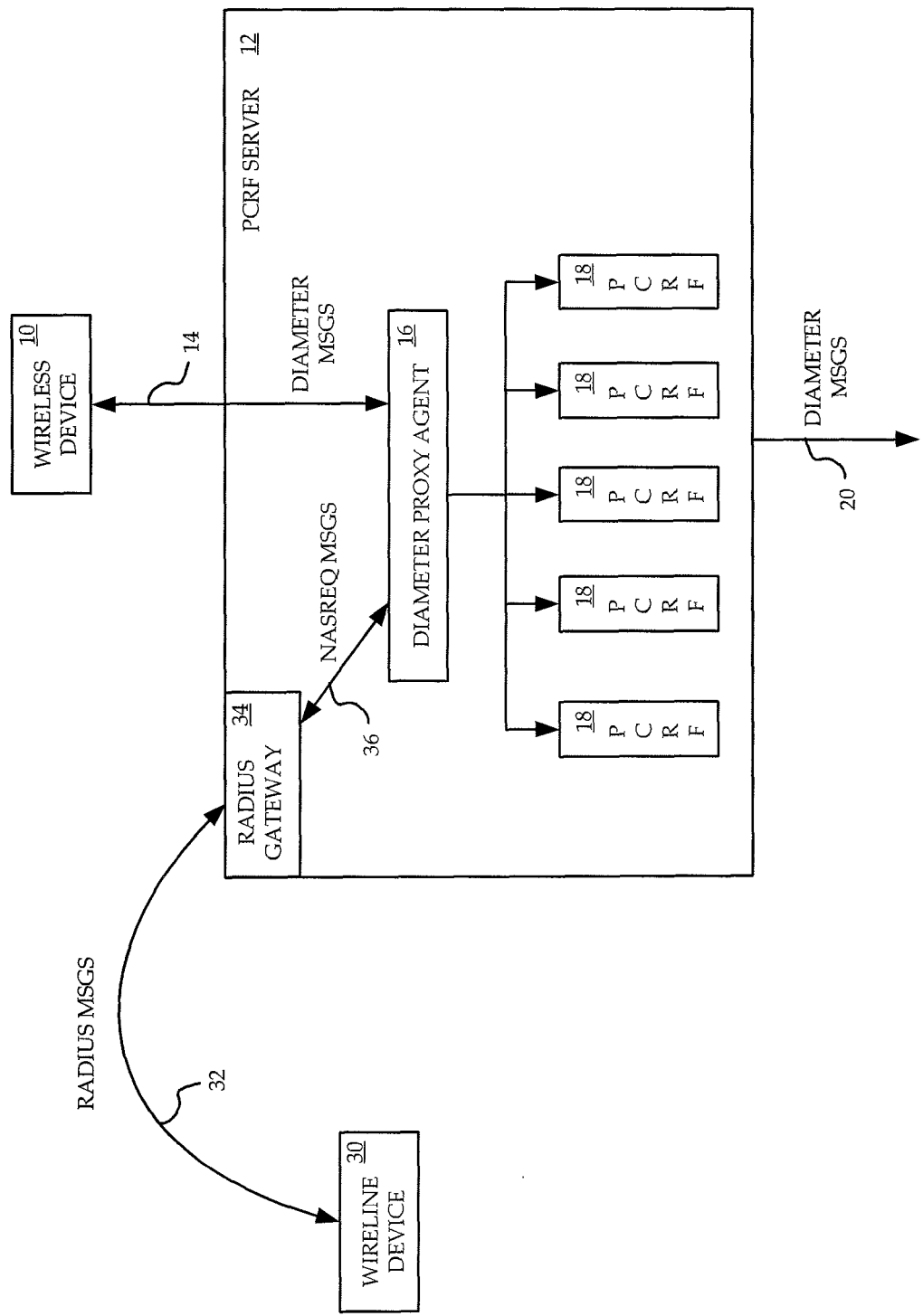
FIG. 1 is a diagram of a PCRF server according to one embodiment of the invention.

Referring to FIG. 1, a diagram of a PCRF server according to one embodiment of the invention is shown. A wireless device 10, such as a mobile telephone, communicates with a PCRF server 12 by sending and receiving Diameter messages 14 to and from a Diameter Proxy Agent 16 within the PCRF server 12. If the wireless device 10 is initiating a new call, then the Diameter Proxy Agent 16 selects one of several PCRFs 18 for servicing the wireless device 10. The PCRFs 18 are usually grouped into clusters of PCRFs. Each PCRF cluster contains two PCRF blades, one of which is active and one of which is standby. The IP address of the PCRF cluster is shared between the PCRF blades, in that packets addressed to the IP address of the PCRF cluster are sent to the active PCRF blade of the cluster, and when the standby PCRF blade becomes the active blade it assumes the IP address. For clarity, the separate PCRF blades in each cluster are not shown in FIG. 1. Instead, each PCRF 18 in FIG. 1 represents both the active blade and the standby blade of one PCRF cluster. Hereinafter, when a packet is said to be sent to a PCRF or an action is taken by a PCRF, it is to be understood that it is the active PCRF blade within the PCRF cluster to which the packet is sent or by which the action is taken.

Once a PCRF 18 is selected, an IP address is assigned to the wireless device 10. The selected PCRF 18 thereafter manages the IP address assigned to the wireless device, authorizes communication from the wireless device, manages policy associated with the wireless device, and provides accounting services associated with the wireless device. The PCRF server 12 communicates with other entities within an EPC, such as a Serving Gateway and a Packet Data Network Gateway (not shown), using Diameter messages 20.

There are five PCRFs 18 shown in FIG. 1. There may be a different number, the number of PCRFs 18 usually depending on the number of customers being served by the owner of the PCRF server 12. In general, there is at least one PCRF 18.

A wireline device 30, such as a landline telephone, a television, or a DSLAM or router, communicates with the PCRF server 12 by sending and receiving Radius messages 32 to and from a Radius gateway 34 within the PCRF server 12. The Radius gateway 34 is shown in FIG. 1 as being part of the PCRF server 12, but may alternatively be or be located on a separate node. The Radius gateway 34 translates each Radius message 32 arriving from the wireline device 30 into a NASReq message 36. The translation between Radius messages and NASReq messages is specified by IETF RFC 4005, incorporated by reference herein. The NASReq message 36 is assigned a Destination-Realm equal to the realm of the PCRF server 12, and the Destination-Host of the NASReq message 36 is left blank. Since routing of the NASReq message 36 is determined by the values of its Destination-Realm and Destination-Host, and the Diameter Proxy Agent 16 has the same realm as the PCRF server 12, the NASReq message 36 is routed to the Diameter Proxy Agent 16 when the Radius gateway 34 transmits the NASReq message 36.

When the Diameter Proxy Agent 16 receives any Diameter message, it determines the value of the Destination-Host of the Diameter message and sends it to the PCRF identified by the Destination-Host. In the case of a NASReq message 36, however, there will be no value for the Destination-Host of the NASReq message 36. In such a case the Diameter Proxy Agent 16 adds a Destination-Host value selected by the Diameter Proxy Agent 16, as described in more detail below with reference to FIG. 2. The NASReq message 36 is then routed to the PCRF identified by the Destination-Host.

When a PCRF 18 receives the NASReq message, it creates or updates a NASReq session object, as described in more detail below with reference to FIG. 3. The PCRF 18 sends a response back to the Diameter Proxy Agent 16, which forwards the response on to the entity which initially sent the corresponding request. In the case of a NASReq message 36 the Diameter Proxy Agent 16 sends the response to the Radius gateway 34. The Radius gateway 34 translates the response, which is also a NASReq message 36, into a Radius message 32 and passes the Radius message 32 to the wireline device 30.

In this way, as far as the wireline device 30 is concerned the PCRF server 12 performs the same functions as are provided for the wireless device 10, but the wireline device 30 is able to communicate with the PCRF server 12 using Radius messages rather than Diameter messages.

Figure 2:
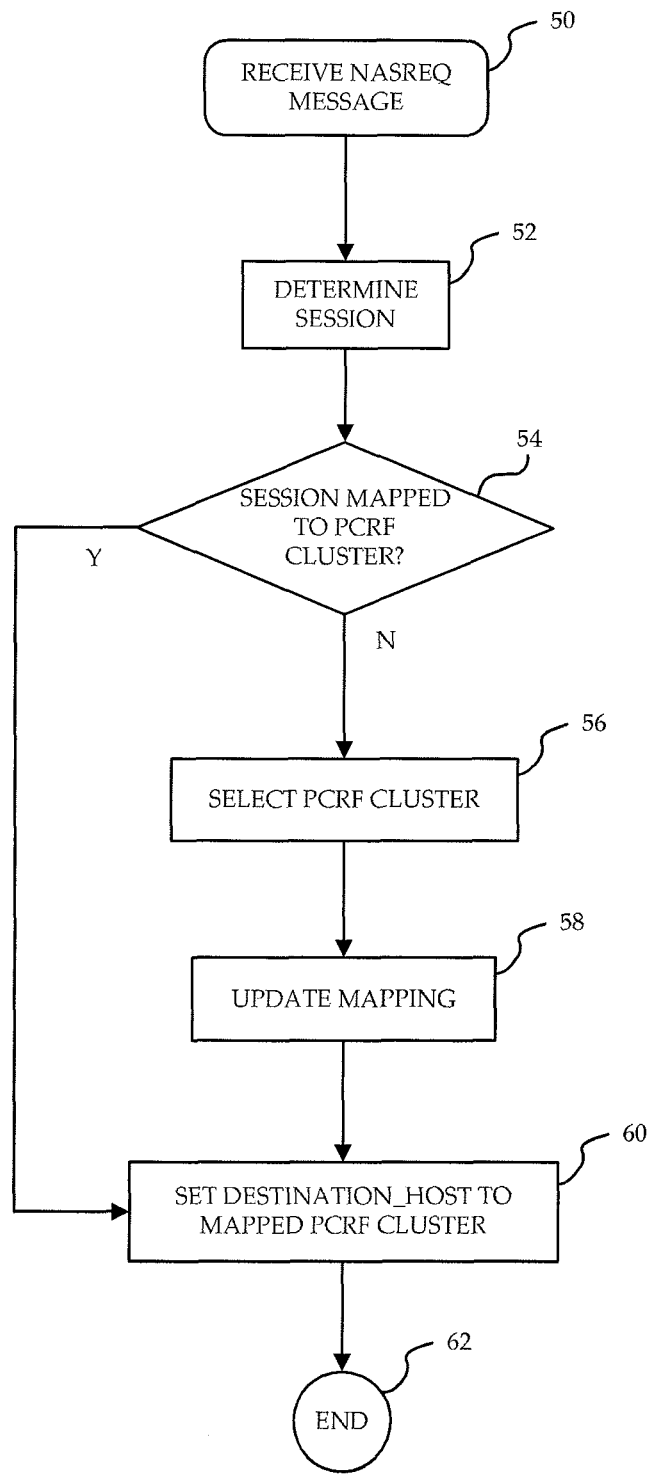
FIG. 2 is a flowchart of a method carried out by the Diameter Proxy Agent of FIG. 1 according to one embodiment of the invention.

Referring to FIG. 2, a flowchart of a method carried out by the Diameter Proxy Agent 16 according to one embodiment of the invention is shown. Broadly, FIG. 2 describes a method by which the Diameter Proxy Agent 16 determines to which PCRF a NASReq message 36 is to be sent. The method is initiated at step 50 when the Diameter Proxy Agent 16 receives a NASReq message 36. The Diameter Proxy Agent 16 recognizes that this Diameter message is a NASReq message 36 from the application-id of the message. At step 52 the Diameter Proxy Agent 16 determines a session identified by the NASReq message 36 from the session ID included in the NASReq message 36. At step 54 the Diameter Proxy Agent 16 determines if the session determined at step 52 is already mapped to a PCRF by consulting a mapping. If not, then at step 56 the Diameter Proxy Agent 16 selects one of the PCRFs 18 in the PCRF server 12, and updates the mapping at step 58 to relate the session to the selected PCRF. The result of all this is that a PCRF is related to the NASReq message 36, either because the Diameter Proxy Agent 16 determined at step 54 that the session is already mapped to a PCRF or because the Diameter Proxy Agent 16 selected one of the PCRFs at step 56. It should be noted that the PCRF 18 related to the NASReq message 36 may also be handling at least one session related to a wireless device or devices, thereby enabling the convergence of management of wireless devices and wireline devices. At step 60 the Diameter Proxy Agent 16 sets the value of the Destination-Host within the NASReq message 36 to the identity of the PCRF related to the NASReq message 36. The method carried out by the Diameter Proxy Agent 16 then finishes, and the populated NASReq message is then routed to the related PCRF at step 62.

The Diameter Proxy Agent 16 may determine a PCRF at step 56 in any of a number of ways. As one example, the Diameter Proxy Agent 16 selects a random PCRF as the selected PCRF cluster. As another example, the Diameter Proxy Agent 16 selects the PCRF to which the fewest sessions are currently mapped.

Figure 3:
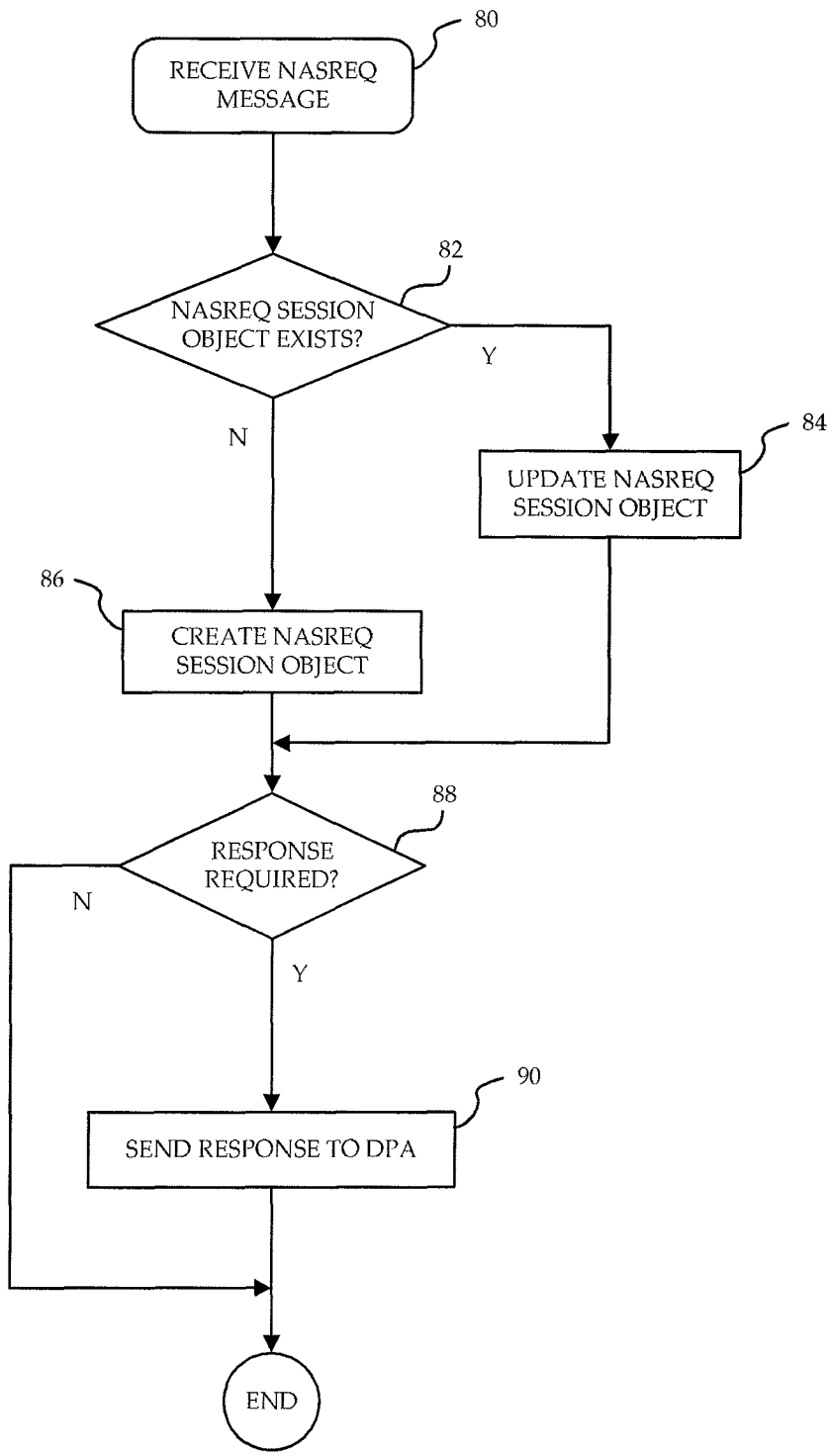
FIG. 3 is a flowchart of another method carried out by each PCRF of FIG. 1 according to one embodiment of the invention.

Referring to FIG. 3, a flowchart of a method carried out by a PCRF 18 according to one embodiment of the invention is shown. Broadly, FIG. 3 describes a method by which a PCRF 18 creates or updates a NASReq session object upon receipt of a NASReq message 36. The method is initiated at step 80 when the PCRF 18 receives a NASReq message 36. At step 82 the PCRF 18 determines whether a NASReq session object for the session identified by the NASReq message already exists. If a NASReq session object for the session already exists, then the existing NASReq session object for the session is updated at step 84. If a NASReq session object for the session does not already exist, then a NASReq session object for the session is created at step 86 and a NASReq session is started. The updated or newly created NASReq session object contains information reflected in the NASReq message, such as which permissions have been granted to the session. In either case, the PCRF 18 then determines at step 88 whether a response to the NASReq message is required. Such a determination will be made based on the type of NASReq message, examples of which are described below. If a response is required then the PCRF 18 sends a response to the Diameter Proxy Agent 16 at step 90.

The type of response sent by the PCRF 18 at step 90, if any will depend on the type of NASReq message received at step 80, which will in turn depend on the type of Radius message received by the Radius gateway 34. As illustrative examples, various scenarios will be described. In each case, messages from the wireline device 30 to the Radius gateway 34 and then to the Diameter Proxy Agent 16 and one of the PCRFs 18 will be handled as described above with reference to FIG. 2 and FIG. 3. This is true both for messages initiated by the wireline device 30 and for responses sent from the wireline device 30 to the PCRF server 12. Messages originating from one of the PCRFs 18, either messages initiated by the PCRF 18 or responses sent by the PCRF 18 towards the wireline device, will be translated from Diameter messages to Radius messages by the Radius gateway 34, but the methods described above with reference to FIG. 2 and FIG. 3 do not apply.

If the wireline device 30 sends an Access-Request message to the Radius gateway 34, then the Radius gateway 34 generates an AA-Request message for sending to the Diameter Proxy Agent 16. A PCRF 18 eventually receives the AA-Request message, and sends an AA-Answer message back to the Diameter Proxy Agent 16, which passes it on to the Radius gateway 34. The Radius gateway 34 receives the AA-Answer message, generates an Access-Accept message, and sends the latter to the wireline device 30.

If the wireline device 30 sends an Acct-Start message to the Radius gateway 34, then the Radius gateway 34 generates an AC-Request message having a value of an Accounting-Record-Type which indicates that it equivalent to an Acct-Start message, and sends the AC-Request message to the Diameter Proxy Agent 16. A PCRF 18 eventually receives the AC-Request message, and sends an AC-Answer message back to the Diameter Proxy Agent 16, which passes it on to the Radius gateway 34. The Radius gateway 34 receives the AC-Answer message, generates an ACK Acct-Start message, and sends the latter to the wireline device 30.

If the wireline device 30 sends an Acct-Stop message to the Radius gateway 34, then the Radius gateway 34 generates an AC-Request message having a value of an Accounting-Record-Type which indicates that it equivalent to an Acct-Stop message, and sends the AC-Request message to the Diameter Proxy Agent 16. A PCRF 18 eventually receives the AC-Request message, and sends an AC-Answer message back to the Diameter Proxy Agent 16, which passes it on to the Radius gateway 34. The Radius gateway 34 receives the AC-Answer message, generates an ACK Acct-Stop message, and sends the latter to the wireline device 30.

If the PCRF handling a session receives notification of a SPR subscription change or an AF update, the PCRF initiates a re-authorization request to the Radius gateway 34. The PCRF generates a Re-Auth-Request message and sends the Re-Auth-Request message to the Diameter Proxy Agent 16, which sends the message on to the Radius gateway 34. The Radius gateway 34 translates the Re-Auth-Request message into a Radius CoA-Request message and sends the CoA-Request message to the wireline device 30. The wireline device 30 should respond to the CoA-Request message by generating a CoA-ACK message or CoA-NAK message and sending the generated message back to the Radius gateway 34. The Radius gateway 34 receives the CoA-ACK message or the CoA-NAK message, and translates the incoming message into a Re-Auth-Answer message. The Re-Auth-Answer message is sent to the Diameter Proxy Agent 16 and then to the PCRF 18.

If the response from the wireline device 30 received by Radius gateway 34 is a CoA-NAK message with a Service-Type Attribute value of "Authorize Only" and with an Error-Cause Attribute value of "Request Initiated", then the wireline device 30 is requesting an extended exchange per IETF RFC 3576. In such a case the Re-Auth-Answer message generated by the Radius gateway 34 has a Result-Code AVP of "Diameter_Limited_Success". Subsequently the Radius gateway 34 should receive an Access-Request message from the wireline device 30, the Access-Request message having a Service-Type of "Authorize Only". The Radius gateway 34 translates this into an AA-Request message with an Auth-Request-Type AVP of Authorize_Only. The AA-Request message is sent to the Diameter Proxy Agent 16 and then to the PCRF. The PCRF responds with an AA-Answer message, and depending on the value of the Result-Code AVP in the AA-Answer message, the Radius gateway 34 translates the AA-Answer message into an Access-Accept message or an Access-Reject message for sending to the wireline device 30.

The PCRF 18 handling a session may receive notification that the session is to be aborted. In such an event, the PCRF 18 generates an Abort-Session-Request message, which is sent to the Diameter Proxy Agent 16 and then to the Radius gateway 34. The Radius gateway 34 translates the Abort-Session-Request message into a Disconnect-Request message, and sends the Disconnect-Request message to the wireline device 30. The wireline device 30 should respond to the Disconnect-Request message by generating a Disconnect-ACK message or Disconnect-NAK message and sending the generated message back to the Radius gateway 34. The Radius gateway 34 receives the Disconnect-ACK message or the Disconnect-NAK message, and translates the incoming message into an Abort-Session-Answer message. The Abort-Session-Answer message is sent to the Diameter Proxy Agent 16 and then to the PCRF 18.

If the response from the wireline device 30 received by Radius gateway 34 is a Disconnect-NAK message with a Service-Type Attribute value of "Authorize Only" and with an Error-Cause Attribute value of "Request Initiated", the Abort-Session-Answer message generated by the Radius gateway 34 has a Result-Code AVP of "Diameter_Limited_Success". Subsequently the Radius gateway 34 should receive an Access-Request message from the wireline device 30, the Access-Request message having a Service-Type of "Authorize Only". The Radius gateway 34 translates this into an AA-Request message with an Auth-Request-Type AVP of Authorize_Only. The AA-Request message is sent to the Diameter Proxy Agent 16 and then to the PCRF. The PCRF responds with an AA-Answer message, and depending on the value of the Result-Code AVP in the AA-Answer message, the Radius gateway 34 translates the AA-Answer message into an Access-Accept message or an Access-Reject message for sending to the wireline device 30.

The Radius gateway 34 and the Diameter Proxy Agent 16 are preferably in the form of software, and may be stored as instructions on computer-readable storage media which can cause a computer processor to execute the methods of the Radius gateway 34 and the Diameter Proxy Agent 16. The methods of the PCRFs 18 are preferably carried out by software on the PCRFs, and the instructions of the methods may be stored on computer-readable storage media which can cause a computer processor to execute the methods. Alternatively, any or all of the components may be in the form of hardware, or a combination of hardware and software.

The embodiments presented are exemplary only and persons skilled in the art would appreciate that variations to the embodiments described above may be made without departing from the spirit of the invention. The scope of the invention is solely defined by the appended claims.

We claim:

1. A method of enabling a communication session for a wireline device, comprising:
   receiving at a Radius gateway a Radius message from the wireline device;
   at the Radius gateway, translating the Radius message into a Network Access Server Request (NASReq) message;
   selecting one of at least one PCRF cluster within a Policy and Charging Rules Function (PCRF) server to handle a communication session identified by the NASReq message, the selected PCRF cluster being configured to handle communication sessions for wireless devices;
   passing the NASReq message to the selected PCRF cluster;
   determining whether a NASReq session object related to the communication session identified by the NASReq message exists;
   if it is determined that such a NASReq session object does not exist, creating such a NASReq session object; and
   if it is determined that such a NASReq session object does exist, updating the NASReq session object to reflect information in the NASReq message.

2. The method of claim 1 wherein the selected PCRF cluster includes an active PCRF blade, and wherein determining whether a NASReq session object related to the communication session identified by the NASReq message exists, creating such a NASReq session object, and updating the NASReq session object to reflect information in the NASReq message are each carried out by the active PCRF blade.

3. The method of claim 1 further comprising the selected PCRF cluster generating and sending a response to the NASReq message if the NASReq message requires a response.

4. The method of claim 1 wherein selecting one of at least one PCRF cluster comprises:
   determining from a mapping if the communication session identified by the NASReq message is currently mapped to one of at least one PCRF cluster in the PCRF server;
   if the communication session identified by the NASReq message is currently mapped to one of at least one PCRF cluster, selecting the one of at least one PCRF cluster to which the communication session is currently mapped; and
   if the communication session identified by the NASReq message is not currently mapped to one of at least one PCRF cluster, selecting one of the at least one PCRF cluster and updating the mapping to indicate that the communication session is mapped to the selected PCRF cluster.

5. The method of claim 4 wherein selecting one of the at least one PCRF cluster comprises selecting a PCRF cluster to which the fewest sessions are currently mapped.

6. The method of claim 1, wherein the Radius gateway is within the PCRF server.

7. A system comprising:
   a Radius gateway for translating a Radius message into a Network Access Server Request (NASReq) message and for transmitting the NASReq message;
   a Diameter Proxy Agent within a Policy and Charging Rules Function (PCRF) server for receiving a NASReq message from the Radius gateway, for selecting one of at least one PCRF cluster within the PCRF server, and for forwarding the NASReq message to the selected PCRF cluster; and
   at least one PCRF blade within the PCRF server, each PCRF blade belonging to one of the at least one PCRF cluster and configured to handle communication sessions for wireless devices, each PCRF blade for receiving a NASReq message from the Diameter Proxy Agent and for creating or updating a NASReq session object related to a communication session identified by the NASReq message received by the PCRF blade in response to receiving the NASReq message.

8. The system of claim 7 further comprising a mapping which maps at least one communication session to each of the at least one PCRF cluster, and wherein the Diameter Proxy Agent is configured to select one of the at least one PCRF cluster by selecting a PCRF cluster to which the fewest sessions are currently mapped.

9. The system of claim 7, wherein the Radius gateway is within the PCRF server.

* * * * *